UNITED STATES PATENT OFFICE.

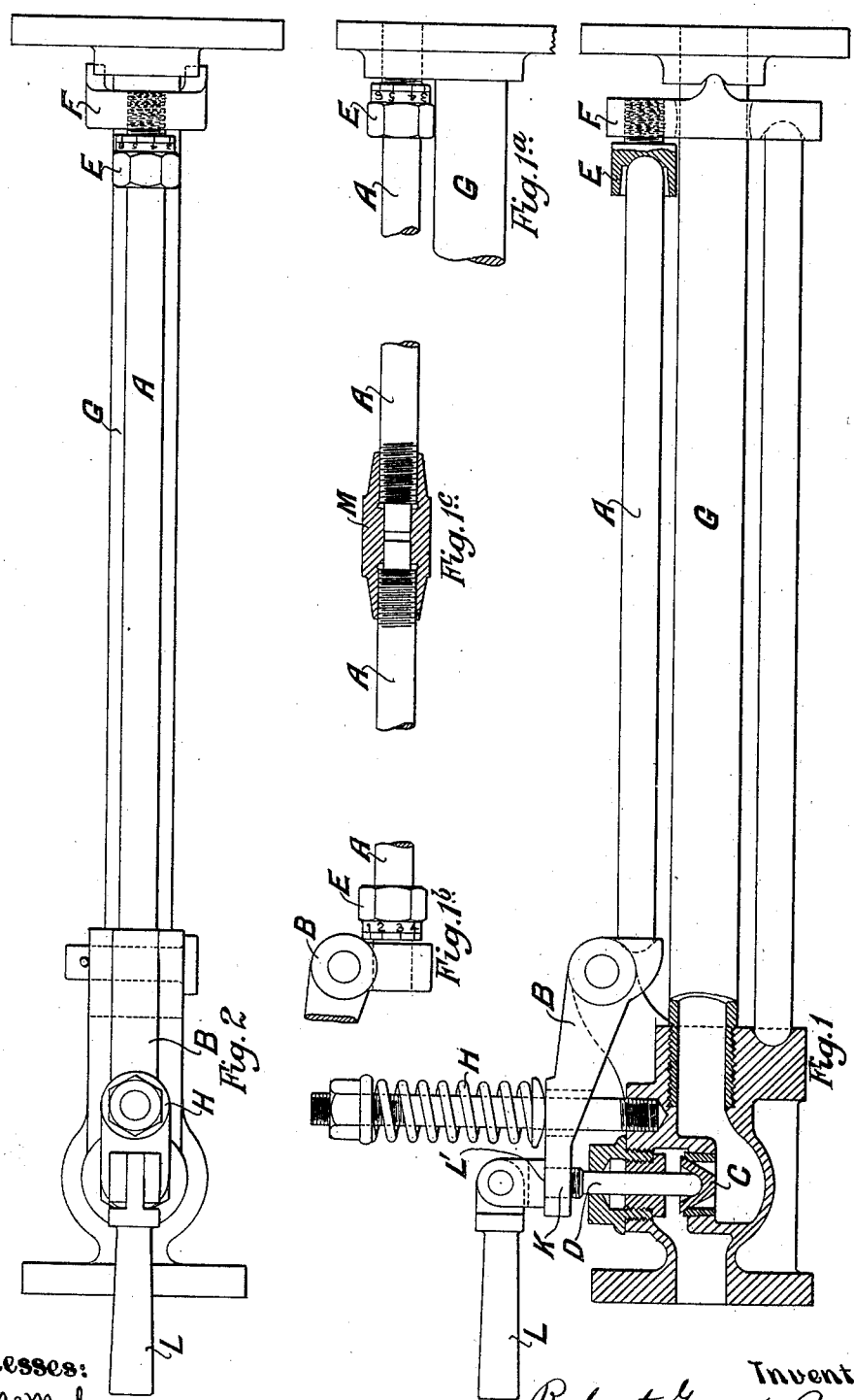

ROBERT GRUNDY BROOKE, OF MACCLESFIELD, ENGLAND.

FITTING FOR STEAM-TRAPS.

SPECIFICATION forming part of Letters Patent No. 669,063, dated February 26, 1901.

Application filed March 12, 1900. Renewed January 31, 1901. Serial No. 45,451. (No model.)

*To all whom it may concern:*

Be it known that I, ROBERT GRUNDY BROOKE, a subject of the Queen of Great Britain and Ireland, and a resident of Upton Grange, Macclesfield, in the county of Chester, England, have invented a certain new and useful Improvement in Fittings for Steam-Traps, (for which I have made application for Letters Patent in Great Britain, No. 1,563, bearing date January 24, 1900,) of which the following is a specification.

This invention has reference to improvements in connection with the fittings for use upon expansion steam-traps, the object being to provide a simple method of adjusting the release of the load upon the valve, and, further, to insure that the movement of the valve-thrusting member shall always return to its correct position after having been manipulated for blowing through or other purposes.

In the accompanying sheet of explanatory drawings, Figure 1 is a sectional elevation, and Fig. 2 a plan, showing my improved fittings applied in one convenient manner to a steam-trap having a single valve for effecting the discharge of the water from the trap. Figs. 1ª, 1ᵇ, and 1ᶜ illustrate modifications of my fittings.

In carrying my invention into effect when applying it to one type of steam-trap, as illustrated, in which one end of a thrust-rod A operates by the contraction of the water-tube member to overcome a spring-loaded valve-lever B, I arrange the thrust-rod A or its end cap or bearing E as the adjustable member to operate upon the spring-loaded valve-lever B instead of causing the spindle or pilot valve-plug D, when such is employed, to be held down by an adjustable screw carried upon the end of the spring-loaded lever. I cause the end of the thrust-rod A in one method of adjustment which I introduce in accordance with my present invention to bear against or seat within a cap or recessed plug E, having a stem which screws adjustably into the end flange or collar F or lever B, forming the abutment to receive the thrust or movement occasioned by the variation of length under expansion and contraction of the tube G, connected to the valve-body. This end cap or receiving-plug E, I screw in or out of the collar or flange F to suit the thrust which is to be given to the spring-loaded lever B. To facilitate the adjustment, I may provide a graduated scale or marking upon the cap head or collar to indicate the position necessary for any desired pressure or temperature.

Upon the lever B, which carries and receives the pressure of the spring H for keeping the valve C upon its seat, I arrange a screwed stud K to project and bear upon the valve-thrusting spindle or plug D, and I form this stud with a shouldered head, preferably jaw-shaped, to which I attach a jointed or pivoted handle or operating-lever L.

When it is desired to release the pressure on the valve spindle or stem D, the jointed handle L is turned so as to unscrew the stud K within the lever B, and thus to raise it from contact with the spindle or plug head D, thereby allowing the steam or water to flow from the tube G through the valve C to exhaust or waste. The jointed handle L enables it to be thrown over to the opposite side, where it would otherwise be stopped through coming into contact with the spring, and thus enables the stud K to be readily turned or removed altogether when so required. The fixed abutment-shoulder L', formed upon the head of the stud K for bearing and thrusting upon the lever, insures that the same final position shall be maintained by the abutment returning to its proper originally-determined position whenever the lever is released and then again screwed back to thrust upon the valve-plug.

Instead of employing a thrust-cap E with an adjustable end screw which engages with the flange or collar F of the tube, as shown in Figs. 1 and 1ª, I may modify my improvements, hereinbefore described, and provide the adjustment in a similar manner upon the end of the spring-loaded lever which secures the thrust-rod, as shown in Fig. 1ᵇ, or, as shown in Fig. 1ᶜ, I may joint the rod or operating member A by means of a coupling-screw M, nut, or like device having threads of different pitch, or right and left hand for varying its length in accordance with the degree of expansion which is to be provided for or to suit any particular requirement. In expansion steam-traps in which a supplementary or pilot valve is employed to release the pressure upon a main or larger valve I employ my adjustable thrust-rod and my jointed operating-lever and stud for thrusting upon the pilot valve stem or plug similarly to the manner hereinbefore described when applying my improvements to a single-valve trap.

It will be observed that the thrust-rod is supported entirely between the abutment F and the heel end of the valve-lever B and that the adjusting devices for said rod are wholly in the line of the rod and of its support, whether in the abutment or in the lever or as a coupling in the rod.

Having now described my invention, what I claim as new, and desire to secure by Letters Patent, is—

In a steam-trap in which the expansion and contraction of a tube or tubes is employed to operate a valve-lever thrust-rod, tube or bar, the combination of a spring-loaded valve-lever, the thrust-rod acting against the heel-arm thereof, the shouldered adjustable screw-stud threaded through the other end and bearing upon the valve-spindle, and the operating-lever hinged to said screw-stud and adapted to be thrown to one side or the other thereof to avoid the valve-lever spring.

In witness whereof I have hereunto set my hand in presence of two witnesses.

ROBERT GRUNDY BROOKE.

Witnesses:
JOHN GRAY,
EDGAR RIGHTON.